(12) United States Patent
Liu et al.

(10) Patent No.: US 12,172,696 B2
(45) Date of Patent: Dec. 24, 2024

(54) LONGITUDINAL BEAM ASSEMBLY AND AUTOMOBILE CHASSIS

(71) Applicant: CONTEMPORARY AMPEREX TECHNOLOGY (HONG KONG) LIMITED, Hong Kong (CN)

(72) Inventors: Shuai Liu, Ningde (CN); Xiaowei Sun, Ningde (CN); Kai Wu, Ningde (CN); Liwen Jiang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/450,930

(22) Filed: Aug. 16, 2023

(65) Prior Publication Data
US 2023/0391403 A1 Dec. 7, 2023

Related U.S. Application Data

(63) Continuation of application No. PCT/CN2021/128622, filed on Nov. 4, 2021.

(51) Int. Cl.
*B62D 21/11* (2006.01)
*B62D 21/02* (2006.01)
*B62D 25/08* (2006.01)

(52) U.S. Cl.
CPC .............. *B62D 21/11* (2013.01); *B62D 21/02* (2013.01); *B62D 25/088* (2013.01)

(58) Field of Classification Search
CPC ....... B62D 21/11; B62D 21/02; B62D 25/088
See application file for complete search history.

(56) References Cited

U.S. PATENT DOCUMENTS

| 5,536,035 A * | 7/1996 | Bautz | ................. B60G 7/02 280/124.147 |
| 10,926,800 B2 * | 2/2021 | Amou | ................. B62D 21/11 |

(Continued)

FOREIGN PATENT DOCUMENTS

| CN | 109131570 A | 1/2019 | |
| CN | 110316250 A * | 10/2019 | ........... B60G 13/003 |

(Continued)

OTHER PUBLICATIONS

The World Intellectual Property Organization (WIPO) International Search Report for PCT/CN2021/128622 Jun. 30, 2022 6 pages (with translation).

(Continued)

*Primary Examiner* — Drew J Brown
(74) *Attorney, Agent, or Firm* — ANOVA LAW GROUP, PLLC

(57) ABSTRACT

A longitudinal beam assembly includes an integrally formed longitudinal beam and a mounting tower. The mounting tower is mounted on the longitudinal beam. The longitudinal beam is provided with a first suspension mounting portion, and the first suspension mounting portion is configured to mount a suspension lower swing arm. The mounting tower is provided with a shock absorber mounting portion and a second suspension mounting portion. The shock absorber mounting portion is configured to mount a shock absorber and the second suspension mounting portion is configured to mount a suspension upper swing arm.

13 Claims, 7 Drawing Sheets

(56) References Cited

U.S. PATENT DOCUMENTS

| | | | |
|---|---|---|---|
| 2010/0194145 A1* | 8/2010 | Akaki | B62D 21/02 |
| | | | 296/187.08 |
| 2021/0101641 A1 | 4/2021 | Kim et al. | |
| 2022/0227426 A1* | 7/2022 | Stojkovic | B62D 25/2036 |

FOREIGN PATENT DOCUMENTS

| | | | | |
|---|---|---|---|---|
| CN | 107031734 B | * | 11/2019 | ............. B62D 21/11 |
| CN | 111376980 A | * | 7/2020 | ............. B60R 19/34 |
| CN | 111376982 A | | 7/2020 | |
| CN | 111391920 A | | 7/2020 | |
| CN | 111391922 A | | 7/2020 | |
| CN | 111746649 A | * | 10/2020 | ............... B60K 1/04 |
| DE | 102015223191 B4 | * | 12/2023 | ............. B60R 19/24 |
| EP | 3144164 A1 | | 3/2017 | |
| WO | WO-2011101906 A1 | * | 8/2011 | ............. B62D 21/02 |
| WO | WO-2011101907 A1 | * | 8/2011 | ............. B60G 3/20 |
| WO | 2015063569 A1 | | 5/2015 | |

OTHER PUBLICATIONS

The European Patent Office (EPO) Extended Search Report for EP Application No. 21962867.4. Feb. 15, 2024. 7 Pages.

* cited by examiner

LONGITUDINAL BEAM ASSEMBLY AND AUTOMOBILE CHASSIS

CROSS-REFERENCE TO RELATED APPLICATION

This application is a continuation of International Application No. PCT/CN2021/128622, filed on Nov. 4, 2021, the entire content of which is incorporated herein by reference.

TECHNICAL FIELD

This application relates to the technical field of automobiles, and in particular, to a longitudinal beam assembly and an automobile chassis.

BACKGROUND

An automobile chassis typically includes various longitudinal beams, crossbeams, floor plates, and the like. The longitudinal beams are used to support and connect various parts assemblies of the automobile, so that the various parts assemblies are maintained in relatively correct mounting positions and carry various loads inside and outside the automobile. The crossbeams are used to guarantee the torsional stiffness of the chassis, withstand longitudinal loads, and support main components on the automobile. The chassis must have sufficient strength and stiffness to withstand the load of the automobile and the impact from the wheels.

The major parts assemblies include a suspension upper swing arm and a shock absorber, which are typically mounted on the chassis. Therefore, during manufacturing of the chassis, structures need to be reserved for mounting the parts such as the suspension upper swing arm and the shock absorber to facilitate the subsequent mounting of the parts.

However, even if the chassis is manufactured in strict accordance with mounting requirements of the parts such as the suspension upper swing arm and the shock absorber, it is still difficult to mount the parts such as the suspension upper swing arm and the shock absorber due to precision deviation of mounting structures reserved on the chassis, resulting in longer installation time and higher costs.

Therefore, how the difficulty in mounting the parts on the chassis is addressed has become an urgent problem to be solved in this field.

SUMMARY

In view of the above problems, embodiments of this application provide a longitudinal beam assembly and an automobile chassis, in which a suspension upper swing arm mounting portion and a shock absorber mounting portion are integrated into and integrally formed with the longitudinal beam. This avoids mounting errors occurring in the separate mounting of the suspension upper swing arm mounting portion and the shock absorber mounting portion to the longitudinal beam, improves the position accuracy of the upper swing arm mounting portion and shock absorber mounting portion relative to the longitudinal beam, simplifies the manufacturing process of the longitudinal beam assembly, and reduces the manufacturing costs of the longitudinal beam assembly.

According to an aspect of the embodiments of this application, a longitudinal beam assembly is provided, including a longitudinal beam and a mounting tower that are integrally formed. The longitudinal beam is provided with a first suspension mounting portion, and the first suspension mounting portion is configured to mount a suspension lower swing arm. The mounting tower is provided with a shock absorber mounting portion and a second suspension mounting portion, the shock absorber mounting portion being configured to mount a shock absorber and the second suspension mounting portion being configured to mount a suspension upper swing arm. The mounting tower is mounted on the longitudinal beam.

With the foregoing solution, the first suspension mounting portion, the second suspension mounting portion, and the shock absorber mounting portion are all integrated on the longitudinal beam and are integrally formed with the longitudinal beam directly or indirectly so that a longitudinal beam assembly structure becomes simpler and more compact. As compared with the related art in which each mounting portion is combined with the longitudinal beam by welding, the longitudinal beam assembly in the embodiments of this application has a simpler manufacturing process, a shorter manufacturing time, and a lower manufacturing cost. In addition, in the integrally formed longitudinal beam assembly manufactured, the first suspension mounting portion, the second suspension mounting portion, and the shock absorber mounting portion are not subject to welding errors, and their positions are more precise, which reduces the difficulty of subsequent mounting of the suspension lower swing arm, the suspension upper swing arm, and the shock absorber and improves the mounting efficiency.

In some embodiments, the mounting tower includes a top wall and two first support members, the shock absorber mounting portion is disposed on the top wall, and the two first support members are disposed respectively on two sides of the top wall and connect the top wall and the longitudinal beam.

With the foregoing solution, two first support members are used to connect the top wall from two sides of the top wall, which makes the connection between the top wall and the longitudinal beam more stable and capable of withstanding the loads transferred by the shock absorber and the suspension upper swing arm during use of the automobile, and saves the manufacturing material, further reducing an overall weight of the longitudinal beam assembly.

In some embodiments, the two first support members are gradually moved away from each other in a direction from the top wall to the longitudinal beam, so as to form a triangular structure between the two first support members and the longitudinal beam.

With the foregoing solution, a triangular structure is formed between the two first support members and the longitudinal beam. The triangular structure is more stable, allowing the mounting tower to withstand a greater load force without deformation during use.

In some embodiments, two suspension mount seats protrude downward from the top wall, and the second suspension mounting portion is disposed between the suspension mount seat and the first support member.

With the foregoing solution, the suspension mount seat and the first support member together define a position of the second suspension mounting portion so that when mounted toward the suspension mounting portion, the suspension upper swing arm can be connected to either the first support member or the suspension mount seat, or to both the first support member and the suspension mount seat, thus providing more mounting possibilities and more load-bearing attachment points for the mounting of the suspension upper swing arm and improving stability of the mounting structure for the suspension upper swing arm.

In some embodiments, the second suspension mounting portion includes two suspension upper swing arm mounting sites, each of which is disposed on a suspension mount seat and a first support member.

With the foregoing solution, when mounted, each suspension upper swing arm is connected to both the first support member and the suspension mount seat, and the suspension upper swing arm is more firmly mounted. The loads withstood by the suspension upper swing arm during the use of the automobile are transferred to the two suspension upper swing arm mounting sites and then transferred to the suspension mount seat and the first support member through the two suspension upper swing arm mounting sites. The suspension mount seat and the first support member are integrally formed with the longitudinal beam directly or indirectly, so the suspension mount seat and the first support member can both withstand relatively large forces without fracture damage, and therefore, the suspension upper swing arm can withstand larger load forces.

In some embodiments, the mounting tower further includes two second support members. The two second support members are disposed between the top wall and the longitudinal beam, and the two second support members are mounted between the two first support members.

With the foregoing solution, the two second support members and the two first support members are jointly supported between the top wall and the longitudinal beam, which makes the structure of the mounting tower more stable and less prone to overturning when bearing the impact from the shock absorber and the suspension upper swing arm.

In some embodiments, the suspension mount seat is connected to the second support member.

With the foregoing solution, the second support member and the suspension mount seat jointly withstand the force from the suspension upper swing arm mounting site on the suspension mount seat during the use of the automobile, making the suspension mounting portion more reliable.

In some embodiments, the first support member is provided with a reinforcing portion, and the second suspension mounting portion is disposed between the suspension mount seat and the reinforcing portion.

With the foregoing solution, the strength of the first support member at which the reinforcing portion is located is increased, which makes the second suspension mounting portion capable of withstanding a relatively large load force after the suspension upper swing arm is mounted on the second suspension mounting portion, and the suspension upper swing arm mounting site disposed on the first support member is not damaged.

In some embodiments, the mounting tower further includes a reinforcing structure in a shape of "X", and the reinforcing structure has four attachment ends, two of the attachment ends being attached to the top wall and the other two of the attachment ends being attached to the longitudinal beam.

With the foregoing solution, the reinforcing structure is supported between the top wall and the longitudinal beam, and the special shape of the reinforcing structure makes a triangular structure between the reinforcing structure and the top wall. A triangular structure also formed between the reinforcing structure and the longitudinal beam makes the whole structure of the mounting tower more stable.

In some embodiments, the attachment ends attached to the top wall are attached at intersections between the top wall and the first support member or the second support member, and the two attachment ends attached to the longitudinal beam are attached at intersections between the longitudinal beam and the first support member or the second support member.

With the foregoing solution, the strength at the intersection of the two components tends to be higher. Therefore, in this embodiment, the connection positions of the reinforcing structure are defined so that two of the attachment ends of the reinforcing structure are attached at positions with higher strength on the top wall and the other two of the attachment ends are attached at positions with higher strength on the longitudinal beam. In this way, the positions with higher strength on the top wall and the positions with higher strength on the longitudinal beam can directly transfer forces between them, allowing the mounting tower to withstand greater loads while maintaining structural stability.

In some embodiments, the first support member and/or the second support member are integrally formed with the top wall.

With the foregoing solution, the mounting tower itself is more integrated and an additional step of connecting the top wall to the first support member or the second support member is omitted, so that the manufacturing process of the mounting tower is simplified, and the manufacturing precision is higher.

In some embodiments, the longitudinal beam is also provided with a stabilizer bar mount seat configured to mount a transverse stabilizer bar.

With the foregoing solution, the transverse stabilizer bar can be mounted directly through a stabilizer bar mount seat provided on the longitudinal beam during mounting without using additional components to connect to the transverse stabilizer bar and the longitudinal beam assembly separately, simplifying the steps for mounting the transverse stabilizer bar. In addition, the stabilizer bar mount seat being provided on the longitudinal beam is conducive to quick mounting of the transverse stabilizer bar and the longitudinal beam because the longitudinal beam is integrally formed and the position precision of the stabilizer bar mount seat is also higher.

In some embodiments, the longitudinal beam is also provided with a motor mount seat configured to mount a drive motor.

With the foregoing solution, the drive motor is mounted on the longitudinal beam, and the longitudinal beam is closer to the driving wheels of the automobile so that power transmission of the drive motor is more efficient.

According to another aspect of the embodiments of this application, there is provided an automobile chassis including the longitudinal beam assembly according to the first aspect, a drive apparatus, and a battery compartment, where the drive apparatus is configured to provide a drive force for the automobile; the battery compartment includes a battery compartment frame, the battery compartment frame being configured to accommodate a battery and the battery being used to provide power to the drive apparatus; and the longitudinal beam assembly is detachably connected to the battery compartment frame.

With the foregoing solution, both the drive apparatus and the battery compartment are located on the automobile chassis. The battery installed in the battery compartment can supply power to the drive apparatus in close proximity and provide power to the drive apparatus efficiently.

In some embodiments, the drive apparatus is mounted on the longitudinal beam assembly.

With the foregoing solution, the battery is located in the battery compartment that is mounted on the longitudinal beam assembly, the drive apparatus is mounted on the longitudinal beam assembly and the battery compartment frame is directly connected to the longitudinal beam assembly, which eliminates structures of the original chassis for the cab such as a crossbeam and a longitudinal beam, significantly reduces the number of parts of the automobile, improves the space utilization of the chassis, helps the battery compartment to carry more batteries, and further improves the endurance performance of the automobile.

In the embodiments of this application, the first suspension mounting portion, the second suspension mounting portion, and the shock absorber mounting portion are all integrated in the longitudinal beam assembly and are integrally formed with the longitudinal beam assembly directly or indirectly so that a longitudinal beam assembly structure becomes simpler and more compact, which reduces the number of parts, shortens manufacturing time, and reduces manufacturing costs. As compared with the related art in which each mounting portion is combined with the longitudinal beam by welding, the longitudinal beam assembly in the embodiments of this application has a simpler manufacturing process, a shorter manufacturing time, and a lower manufacturing cost. In addition, in the integrally formed longitudinal beam assembly manufactured, the first suspension mounting portion, the second suspension mounting portion, and the shock absorber mounting portion are not subject to welding errors, and their positions are more precise, which reduces the difficulty of subsequent mounting of the suspension lower swing arm, the suspension upper swing arm, and the shock absorber and improves the mounting efficiency.

The foregoing description is merely an overview of the technical solutions in the embodiments of this application. In order to better understand the technical means in the embodiments of this application, to achieve implementation according to content of the specification, and to make the above and other objects, features and advantages in the embodiments of this application more obvious and easy to understand, the following describes specific embodiments of this application.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of this application, and persons of ordinary skill in the art may still derive other drawings from these accompanying drawings without creative efforts.

DESCRIPTION OF REFERENCE NUMERALS

Figure 1:
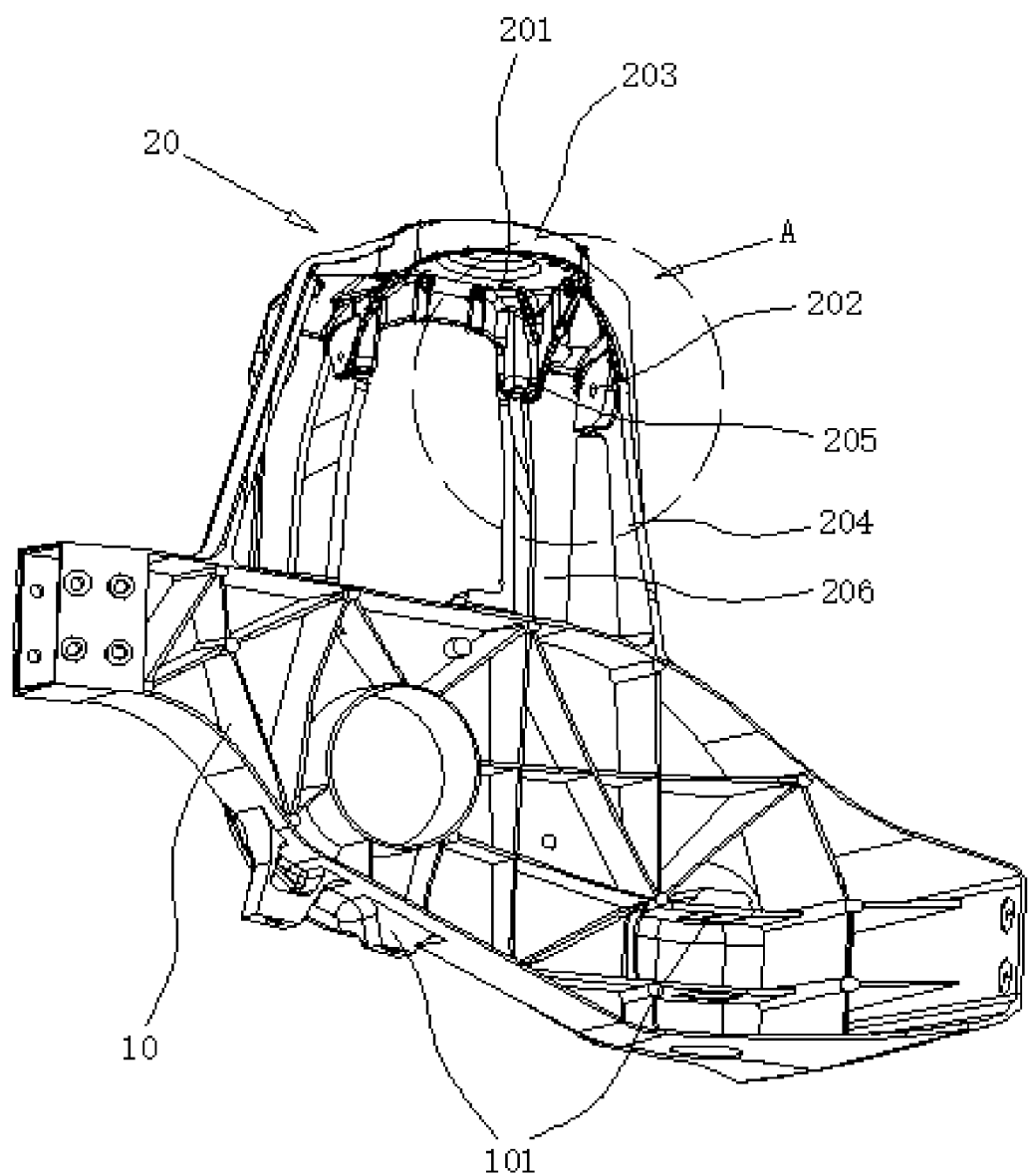
FIG. 1 is a schematic structural diagram of a longitudinal beam assembly according to an embodiment of this application.

10. longitudinal beam; 101. first suspension mounting portion; 102. stabilizer bar mount seat; 103. motor mount seat; 20. mounting tower; 201. shock absorber mounting portion; 202. second suspension mounting portion; 203. top wall; 204. first support member; 205. suspension mount seat; 2051. suspension upper swing arm mounting site; 206. second support member; 207. reinforcing portion; 208. reinforcing structure; 2081. attachment end; 30. suspension lower swing arm; 40. suspension upper swing arm; 50. shock absorber; 60. transverse stabilizer bar; 70. crossbeam; 80. anti-collision beam; 90. battery compartment frame; and 100. drive apparatus.

DESCRIPTION OF EMBODIMENTS

To make the objectives, technical solutions, and advantages of the embodiments of this application clearer, the following clearly and completely describes the technical solutions in the embodiments of this application with reference to the accompanying drawings in the embodiments of this application. Apparently, the described embodiments are some but not all embodiments of this application. All other embodiments obtained by persons of ordinary skill in the art based on the embodiments of this application without creative efforts shall fall within the protection scope of this application.

Unless otherwise defined, meanings of all technical and scientific terms used in this specification are the same as those commonly understood by persons skilled in the art of this application. The terms used in this specification of this application are merely intended to describe specific embodiments, but not to limit this application.

The terms "comprise", "include", and any variants thereof in the descriptions of the specification, claims, and accompanying drawings of this application are intended to cover a non-exclusive inclusion. The word "a" or "an" does not exclude existence of more than one.

In this specification, reference to "embodiment" means that specific features, structures or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

The term "and/or" in this specification is only an associative relationship for describing associated objects, indicating that three relationships may exist. For example, A and/or B may indicate three scenarios: A alone; A and B; and B alone. In addition, the character "/" in this specification generally indicates an "or" relationship between contextually associated objects.

The orientation terms appearing in the following description all refer to the orientations as shown in the drawings and do not limit the specific structure of the longitudinal beam assembly or the automobile chassis in this application. For example, in the descriptions of this application, the orientations or positional relationships indicated by the terms "center", "longitudinal", "transverse", "length", "width", "thickness", "upper", "lower", "front", "rear", "left", "right", "vertical", "horizontal", "top", "bottom", "inside", "outside", "clockwise", "counterclockwise", "axial", "radial", "circumferential", and the like are based on the orientations or positional relationships as shown in the accompanying drawings. These terms are merely for the ease and brevity of descriptions of this application rather than indicating or implying that the apparatuses or components mentioned must have specific orientations or must be constructed and manipulated according to specific orientations, and therefore shall not be construed as any limitations on this application.

In addition, expressions such as the direction X, the direction Y, and the direction Z that are used to describe indication directions of operations and constructions of various members of the longitudinal beam assembly or the automobile chassis in the embodiments are relative rather than absolute. Although these indications are appropriate when the members of the battery are located at the positions shown in the figures, these directions shall be interpreted differently when the positions change, to reflect the changes.

In addition, in the specification, claims, or accompanying drawings of this application, the terms "first", "second", and the like are intended to distinguish between different objects rather than to indicate a particular order, and can explicitly or implicitly include one or more features.

In the descriptions of this application, unless otherwise specified, the term "a plurality of" means more than two (inclusive). Similarly, "a plurality of groups" means more than two (inclusive) groups.

In the descriptions of this application, it should be noted that, unless otherwise specified and defined explicitly, the terms "installed", "connected", and "connection" should be understood broadly. For example, "connected" or "connection" of a mechanical structure may indicate physical connection. For example, the physical connection may be fixed connection, for example, fixed connection by using a fixing member such as a screw, a bolt, or other fixing members; or the physical connection may be detachable connection, for example, connection by mutual clamping or clamping; or the physical connection may be integral connection, for example, connection by welding, bonding, or integral forming. "Connected" or "connection" of a circuit structure may indicate physical connection, and may also indicate electrical connection or signal connection, for example, may be direct connection, that is, the physical connection, may be indirect connection by using at least one element in between as long as circuit communication is implemented, and may also be communication between two elements; and the signal connection may be signal connection by using a circuit, and may also be signal connection by using a medium, such as a radio wave. Persons of ordinary skill in the art can understand specific meanings of these terms in this application as appropriate to specific situations.

An automobile chassis generally includes longitudinal beams and crossbeams. The longitudinal beams are used to support and connect various parts assemblies of the automobile, so that the various parts assemblies are maintained in relatively correct mounting positions and carry various loads inside and outside the automobile. The crossbeams are used to guarantee the torsional stiffness of the chassis, withstand longitudinal loads, and support main components on the automobile. The chassis must have sufficient strength and stiffness to withstand the load of the automobile and the impact from the wheels.

The major parts assemblies include a suspension upper swing arm and a shock absorber, which are typically mounted on the chassis. Therefore, the chassis needs to be manufactured with a structure reserved for mounting the parts such as the suspension upper swing arm and the shock absorber to facilitate the mounting of subsequent parts.

However, even if the chassis is manufactured in strict accordance with mounting requirements of the parts such as the suspension upper swing arm and the shock absorber, it is still difficult to mount the parts such as the suspension upper swing arm and the shock absorber due to precision deviation of mounting structures reserved on the chassis, resulting in longer installation time and higher costs.

The inventors found through research that this is due to the fact that most of the longitudinal beams of current automobile models on the market are made of multiple parts welded together, and correspondingly different molds need to be developed for different parts to cast the corresponding parts. Furthermore, because the suspension upper swing arm, shock absorber, and the like of the automobile are mounted on different parts, and deviations in position and shape inevitably exist between different parts during welding, resulting in difficulty in mounting the suspension upper swing arm, shock absorber, and the like, and accordingly, the costs are further increased.

In addition, due to existence of a large number of welded joints and weld seams in the chassis after welding, the structural safety and reliability of the automobile chassis are also seriously reduced.

In view of this, an embodiment of this application provides a longitudinal beam assembly, in which a suspension upper swing arm mounting portion and a shock absorber mounting portion are integrated into and integrally formed with the longitudinal beam, which avoids mounting errors occurring in the separate mounting of the suspension upper swing arm mounting portion and the shock absorber mounting portion to the longitudinal beam, improves the position accuracy of the upper swing arm mounting portion and shock absorber mounting portion relative to the longitudinal beam, simplifies the manufacturing process of the longitudinal beam assembly, and reduces the manufacturing costs of the longitudinal beam assembly. Moreover, the structural safety and reliability of the longitudinal beam assembly are also higher.

Figure 2:
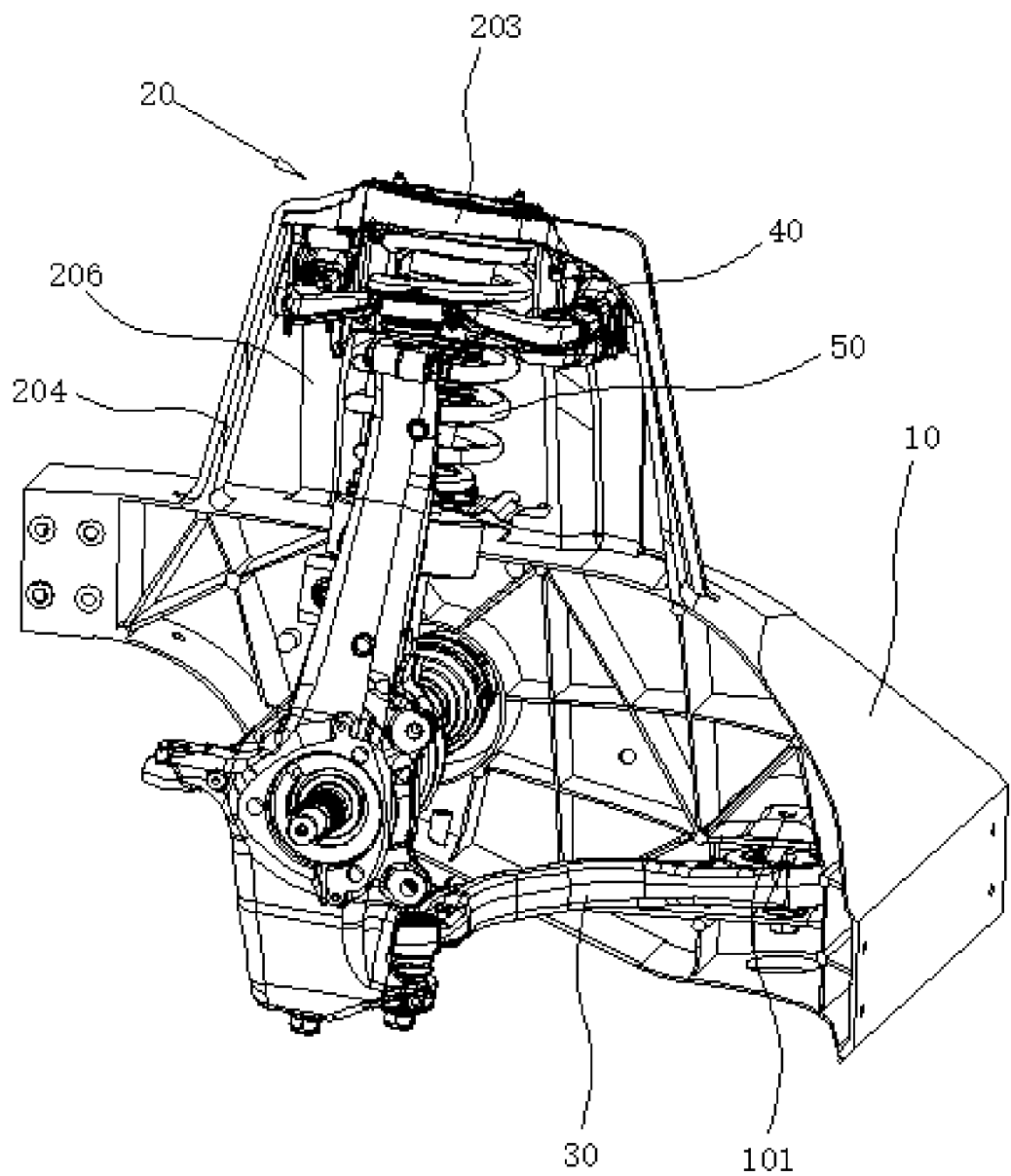
FIG. 2 is a schematic structural diagram with a shock absorber tower, a suspension lower swing arm, and a suspension upper swing arm all mounted on the longitudinal beam assembly according to an embodiment of this application.

FIG. 1 is a schematic structural diagram of a longitudinal beam assembly according to an embodiment of this application, and FIG. 2 is a schematic structural diagram with a shock absorber tower, a suspension lower swing arm 30, and a suspension upper swing arm 40 all mounted on the longitudinal beam assembly. As shown in FIG. 1 and FIG. 2, the longitudinal beam assembly provided in this embodiment of this application includes a longitudinal beam 10 and a mounting tower 20. The longitudinal beam 10 is provided with a first suspension mounting portion 101, and the first suspension mounting portion 101 is configured to mount the suspension lower swing arm 30. The mounting tower 20 is provided with a shock absorber mounting portion 201 and a second suspension mounting portion 202, the shock absorber mounting portion 201 being configured to mount a shock absorber 50 and the second suspension mounting portion 202 being configured to mount a suspension upper swing arm 40. The mounting tower 20 is mounted on the longitudinal beam 10.

The material of the longitudinal beam 10 is steel or aluminum alloy. The longitudinal beam 10 may be straight or made curved in plane or space. A cross section of the longitudinal beam 10 may be a uniform or non-uniform cross section, and cross-sectional shapes thereof at different positions may be the same or different. For example, sectional shapes at different positions of the longitudinal beam 10 are all a groove type with one side open. In addition, the longitudinal beam 10 may be of the box type, with internal partitions to connect side walls in any different directions to strengthen the longitudinal beam 10.

The longitudinal beam 10 itself is integrally formed, and the longitudinal beam 10 and the mounting tower 20 are also integrally formed. For example, the longitudinal beam 10 and the mounting tower 20 are integrally formed by a casting process.

The mounting tower 20 is a structure protruding above the longitudinal beam 10, with no special provisions on its structure and shape. However, because the shock absorber 50 and the suspension upper swing arm 40 need to be mounted on the mounting tower 20, and the shock absorber 50 and the suspension upper swing arm 40 are important parts for connecting the body and chassis of the automobile, the mounting tower 20 needs to withstand large transverse loads, longitudinal loads, and torsional forces. These stresses will eventually be transferred to the mounting tower 20 through the shock absorber 50 and the suspension upper swing arm 40 and then to the longitudinal beam 10. Therefore, the mounting tower 20 needs to have sufficient strength and stiffness to withstand these loads.

Because the shock absorber mounting portion 201 and the second suspension mounting portion 202 need to be provided on the mounting tower 20, space between the mounting tower 20 and the longitudinal beam 10 needs to be reserved for provision of the suspension components such as the shock absorber 50. Therefore, the mounting tower 20 can be provided in the form of a side opening, or the mounting tower 20 is in the form of a shell with an accommodating cavity inside to accommodate the shock absorber 50 and other suspension components connected to the suspension upper swing arm 40.

As shown in FIG. 1, the shock absorber mounting portion 201 may be a mounting hole, a mount seat, or a component capable of cooperating with the shock absorber 50 to put the shock absorber 50 therein, and the component enables connection of the shock absorber 50 to the mounting tower 20. The shock absorber mounting portion 201 can be disposed in the upper, middle, or lower part of the mounting tower 20, depending on the height of the mounting tower 20 and the height and structure of the shock absorber 50.

As shown in FIG. 1, the second suspension mounting portion 202 may also be a mounting hole, a mount seat, or a structure capable of cooperating with the suspension upper swing arm 40 to put the suspension upper swing arm 40 therein, and the suspension upper swing arm 40 can be connected to the mounting tower 20 within the structure. The second suspension mounting portions 202 are generally provided in pairs. To enable the second suspension mounting portion 202 to resist the load transferred by the suspension upper swing arm 40 without damage or failure, the second suspension mounting portion 202 is generally disposed on the mounting tower 20 at a position with greater strength or thickness.

The first suspension mounting portion 101 may be provided in pairs or individually on the longitudinal beam 10, as long as the number of the first suspension mounting portions 101 corresponds to the number of suspension lower swing arms 30 of a designed chassis, and the first suspension mounting portion 101 may be disposed on the upper part, the lower part, or a side of the longitudinal beam 10. It should be noted that after the suspension lower swing arm 30 is mounted to the first suspension mounting portion 101, and the suspension upper swing arm 40 is mounted on the second suspension mounting portion 202, it is needed to ensure that the suspension upper swing arm 40 and the suspension lower swing arm 30 are facing a same side of the longitudinal beam 10.

With the foregoing solution, the first suspension mounting portion 101, the second suspension mounting portion 202, and the shock absorber mounting portion 201 are all integrated on the longitudinal beam 10 and are integrally formed with the longitudinal beam 10 directly or indirectly so that a longitudinal beam assembly structure becomes simpler and more compact. As compared with the related art in which each mounting portion is combined with the longitudinal beam 10 by welding, the longitudinal beam assembly in the embodiments of this application has a simpler manufacturing process, a shorter manufacturing time, and a lower manufacturing cost. In addition, in the integrally formed longitudinal beam assembly manufactured, the first suspension mounting portion 101, the second suspension mounting portion 202, and the shock absorber mounting portion 201 are not subject to welding errors, and their positions are more precise, which reduces the difficulty of subsequent mounting of the suspension lower swing arm 30, the suspension upper swing arm 40, and the shock absorber 50 and improves the mounting efficiency. In addition, the structural safety and reliability of the automobile chassis are also improved due to fewer welded joints and weld seams in the longitudinal beam assembly.

As shown in FIG. 1 and FIG. 2, In some embodiments, the mounting tower 20 includes a top wall 203 and two first support members 204, the shock absorber mounting portion 201 is disposed on the top wall 203, and the two first support members 204 are disposed respectively on two sides of the top wall 203 and connect the top wall 203 and the longitudinal beam 10.

Because the first support member 204 is configured to connect the top wall 203 and the longitudinal beam 10, in terms of the first support member 204, there is a relatively large distance between the top wall 203 and the longitudinal beam 10. The top wall 203 can be flat-plate shaped, square, or other shaped structure, and in order to improve the strength of the top wall 203, the top wall 203 can be made thicker, or a reinforcing part can be made on the top wall 203, for example, a part of the top wall 203 is thickened, or an integrally formed reinforcing rib is provided on the top wall 203, so as to increase the strength of the top wall 203.

The first support member 204 may be disposed on two sides of the top wall 203 in a length direction of the longitudinal beam 10, or on two sides of a width direction of the longitudinal beam 10. This is not limited in this embodiment of this application. A cross-sectional shape of the first support member 204 in a direction perpendicular to its own length may be rectangular, triangular, circular, or the like. In addition, the cross-sectional shape of the first support member 204 in the direction perpendicular to its own length may be constant or variable. The first support member 204 connects the top wall 203 and the longitudinal beam from only two sides of the top wall 203 so that there is a space between a central lower part of the top wall 203 and the longitudinal beam 10, and at least part of the shock absorber 50 can be located in this space when the shock absorber 50 is mounted on the top wall 203.

In some embodiments, the shock absorber mounting portion 201 may be a connection hole for a bolt to run through for threaded connection with one end of the shock absorber 50. Certainly, the shock absorber mounting portion 201 may be of other construction as long as it is capable of connecting the shock absorber 50 to the top wall 203.

With the foregoing solution, two first support members 204 are used to connect the top wall 203 from two sides of the top wall 203, which makes the connection between the top wall 203 and the longitudinal beam 10 more stable and capable of withstanding the loads transferred by the shock absorber 50 and the suspension upper swing arm 40 during use of the automobile, and saves the manufacturing material, further reducing an overall weight of the longitudinal beam assembly.

Because loads withstood by the shock absorber 50 and the suspension upper swing arm 40 need to be transferred to the longitudinal beam 10 through the first support member 204, in some embodiments, to increase the strength of the first support member 204, the first support member 204 is provided with a protruding reinforcing rib or reinforcing groove in the length direction so that the first support member 204 has relatively high tensile and bending strength to prevent the first support member 204 from being deformed due to a relatively large load when the automobile is running.

As shown in FIG. 1 and FIG. 2, in some embodiments, the two first support members 204 are gradually moved away from each other in a direction from the top wall 203 to the longitudinal beam 10, so as to form a triangular structure between the two first support members 204 and the longitudinal beam 10.

With the foregoing solution, a triangular structure is formed between the two first support members 204 and the longitudinal beam 10. The triangular structure is more stable, allowing the mounting tower 20 to withstand a greater load force without deformation during use. In addition, such an arrangement also allows a larger space between the two first support members 204, thereby helping suspension components such as the shock absorber 50 and the suspension upper swing arm 40 to move within the space.

As shown in FIG. 1, in some embodiments, two suspension mount seats 205 protrude downward from the top wall 203, and the second suspension mounting portion 202 is disposed between the suspension mount seat 205 and the first support member 204.

The suspension mount seat 205 and the first support member 204 together define a position of the second suspension mounting portion 202 so that when mounted toward the suspension mounting portion, the suspension upper swing arm 40 can be connected to either the first support member 204 or the suspension mount seat 205, or to both the first support member 204 and the suspension mount seat 205. This provides more mounting possibilities and more load-bearing attachment points for the mounting of the suspension upper swing arm 40 and improves stability of the mounting structure for the suspension upper swing arm 40.

The suspension mount seat 205 is a part protruding from the lower surface of the top wall 203. To increase the load capacity of the suspension mount seat 205, in some embodiments, the horizontal cross section of the suspension mount seat 205 can be made to gradually increase from the bottom to the top, which means that the thickness or width of the suspension mount seat 205 gradually increases in a direction from a position on the suspension mount seat away from the top wall 203 to a position on the suspension mount seat close to the top wall 203, and such an arrangement makes an area of a joint between the suspension mount seat 205 and the top wall 203 larger, so that the top wall 203 is more firmly joined, and when the load force withstood by the suspension upper swing arm 40 is transferred to the top wall 203 through the suspension mount seat 205, the suspension mount seat 205 is not prone to fracture due to a relatively large load.

Figure 3:
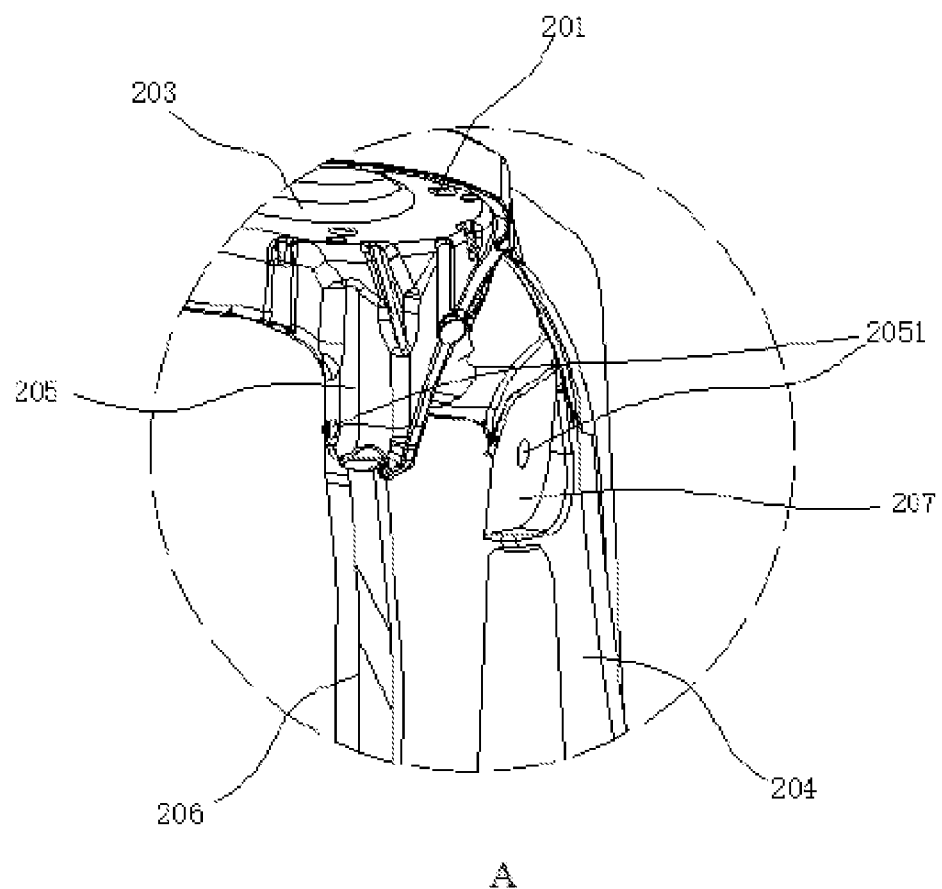
FIG. 3 is a schematic diagram of an enlarged structure of part A in FIG. 1.

As shown in FIG. 3, in some embodiments, the second suspension mounting portion 202 includes two suspension upper swing arm mounting sites 2051, each suspension upper swing arm mounting site 2051 being disposed on one suspension mount seat 205 and one first support member 204.

The suspension upper swing arm mounting sites 2051 can be understood to be specific mounting locations for the suspension upper swing arm 40, and the two suspension upper swing arm mounting sites 2051 can respectively have one suspension upper swing arm 40 mounted.

Each suspension upper swing arm mounting site 2051 is disposed on one suspension mount seat 205 and one first support member 204, which means that each suspension upper swing arm mounting site 2051 has one portion disposed on the suspension mount seat 205 and another portion disposed on the first support member 204, and the suspension mount seats 205 and the first support members 204 on which the two different suspension upper swing arm mounting sites 2051 are located are different suspension mount seats 205 and first support members 204.

With the foregoing solution, when mounted, each suspension upper swing arm 40 is connected to both the first support member 204 and the suspension mount seat 205, and the suspension upper swing arm 40 is more firmly mounted. The loads carried by the suspension upper swing arm 40 during the use of the automobile are transferred to the two suspension upper swing arm mounting sites 2051, and then transferred to the suspension mount seat 205 and the first support member 204 through the two suspension upper swing arm mounting sites 2051. The suspension mount seat 205 and the first support member 204 are integrally formed with the longitudinal beam 10 directly or indirectly, so the suspension mount seat 205 and the first support member 204 can both withstand larger forces without fracture damage, and thus, the suspension upper swing arm 40 can withstand larger load forces.

As shown in FIG. 1 and FIG. 2, in some embodiments, the mounting tower 20 also includes two second support members 206. The two second support members 206 are disposed between the top wall 203 and the longitudinal beam 10, and the two second support members 206 are mounted between the two first support members 204.

The second support members 206 serve the same or similar purpose as the first support members 204 to form a support and connection between the top wall 203 and the longitudinal beam 10 to transfer the forces received by the top wall 203 from the automobile body to the longitudinal beam 10. Because the two second support members 206 are mounted between the two first support members 204, most of the forces withstood by the two second support members 206 are longitudinal forces from the top wall 203 to the longitudinal beam 10, while the two first support members 204 are capable of withstanding a relatively large transverse force. The second support member 206 may be of any shape, and in addition, the shapes of the second support member 206 and the first support member 204 may be the same or different. This is not limited in this embodiment of this application.

The two second support members 206 and the two first support members 204 are jointly supported between the top wall 203 and the longitudinal beam 10, which makes the structure of the mounting tower 20 more stable and less prone to overturning when bearing the impact from the shock absorber 50 and the suspension upper swing arm 40.

In some embodiments, the suspension mount seat 205 is connected to the second support member 206.

The suspension mount seat 205 and the second support member 206 may be integrally formed or may be connected to each other by using a mechanical member, for example, a bolted joint and pin shaft connection.

The connection between the suspension mount seat 205 and the second support member 206 is such that a mechanical connection is established between the suspension mount seat 205 and the second support member 206. The second support member 206 and the suspension mount seat 205 can jointly withstand the force from the suspension upper swing arm mounting site 2051 on the suspension mount seat 205 during the use of the automobile, making the structural strength and structural reliability of the suspension mounting portion stronger.

As shown in FIG. 3, in some embodiments, the first support member 204 is provided with a reinforcing portion 207, and the second suspension mounting portion 202 is disposed between the suspension mount seat 205 and the reinforcing portion 207.

With the foregoing solution, a cross-sectional size of the first support member 204 on which the reinforcing portion 207 is located is increased, and therefore the strength of the first support member 204 is also increased, which makes the second suspension mounting portion 202 capable of withstanding a relatively large load force after the suspension upper swing arm 40 is mounted on the second suspension mounting portion 202, and the suspension upper swing arm mounting site 2051 disposed on the first support member 204 is not easily damaged.

Figure 4:
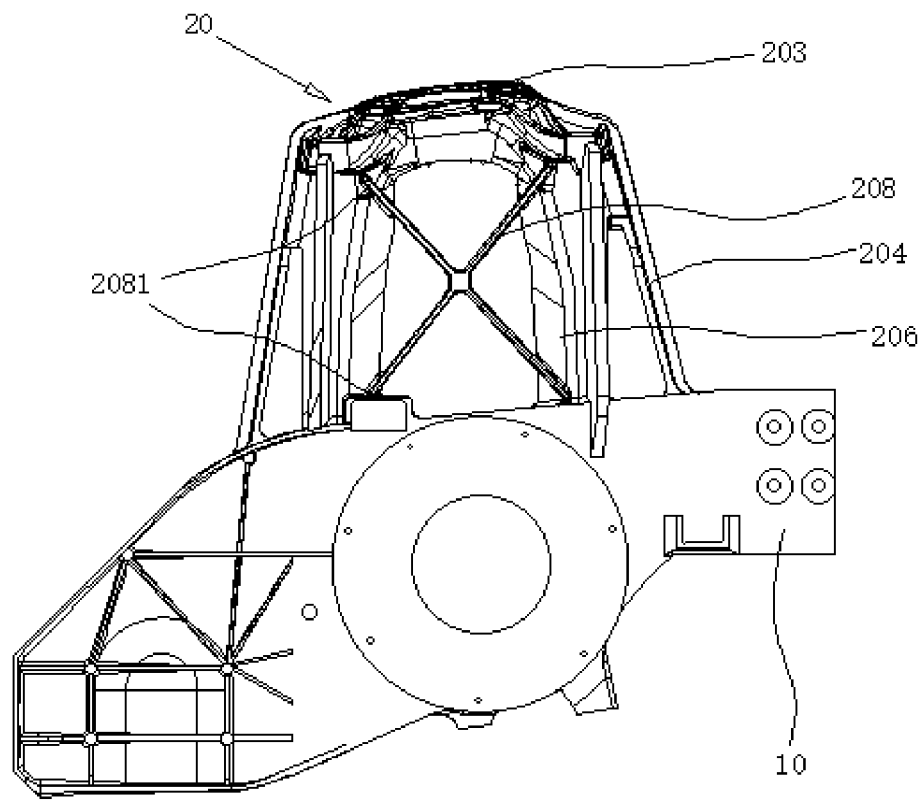
FIG. 4 is a schematic structural diagram of a longitudinal beam assembly according to another embodiment of this application.

As shown in FIG. 4, in some embodiments, the mounting tower 20 also includes a reinforcing structure 208 in a shape of "X", and the reinforcing structure 208 has four attachment ends 2081, two of the attachment ends 2081 are attached to the top wall 203 and the other two of the attachment ends 2081 are attached to the longitudinal beam 10.

The reinforcing structure 208 may be an integrally formed "X" shape or an assembled "X" shape. The reinforcing structure 208 is made of a metal material with greater strength and hardness such as steel or aluminum alloy, and the plane on which the reinforcing structure 208 is located may be parallel to the length direction of the longitudinal beam 10 or have an angle with the length direction of the longitudinal beam 10. This is not limited in this embodiment of this application.

The reinforcing structure 208 is supported between the top wall 203 and the longitudinal beam 10, and the special shape of the reinforcing structure 208 makes a triangular structure between the reinforcing structure 208 and the top wall 203, and a triangular structure is also formed between the reinforcing structure 208 and the longitudinal beam 10. In this way, a bearing capacity of the mounting tower 20 for longitudinal load is enhanced and its bearing capacity for transverse torsion force is also enhanced, so that the whole structure of the mounting tower 20 is more stable.

As shown in FIG. 4, in some embodiments, the attachment ends 2081 attached to the top wall 203 are attached at intersections between the top wall 203 and the first support member 204 or the second support member 206, and the two attachment ends 2081 attached to the longitudinal beam 10 are attached at intersections between the longitudinal beam 10 and the first support member 204 or the second support member 206.

With the foregoing solution, the strength at the intersection of the two components tends to be higher. Therefore, in this embodiment, the connection positions of the reinforcing structure 208 are defined so that two of the attachment ends 2081 of the reinforcing structure 208 are attached at positions with higher strength on the top wall 203 and the other two of the attachment ends 2081 are attached at positions with higher strength on the longitudinal beam 10. In this way, the positions with higher strength on the top wall 203 and the positions with higher strength on the longitudinal beam 10 can directly transfer forces between them, allowing the mounting tower 20 to withstand greater loads while maintaining structural stability.

In some embodiments, the first support member 204 and/or the second support member 206 are integrally formed with the top wall 203.

The above technical solution can be specifically that the first support member 204 is integrally formed with the top wall 203, the second support member 206 is integrally formed with the top wall 203, or both the first support member 204 and the second support member 206 are integrally formed with the top wall 203.

With the foregoing solution, the mounting tower 20 itself is more integrated and an additional step of connecting the top wall 203 to the first support member 204 or the second support member 206 is omitted, so that the manufacturing process of the mounting tower 20 is simplified, and the manufacturing precision is higher.

Figure 5:
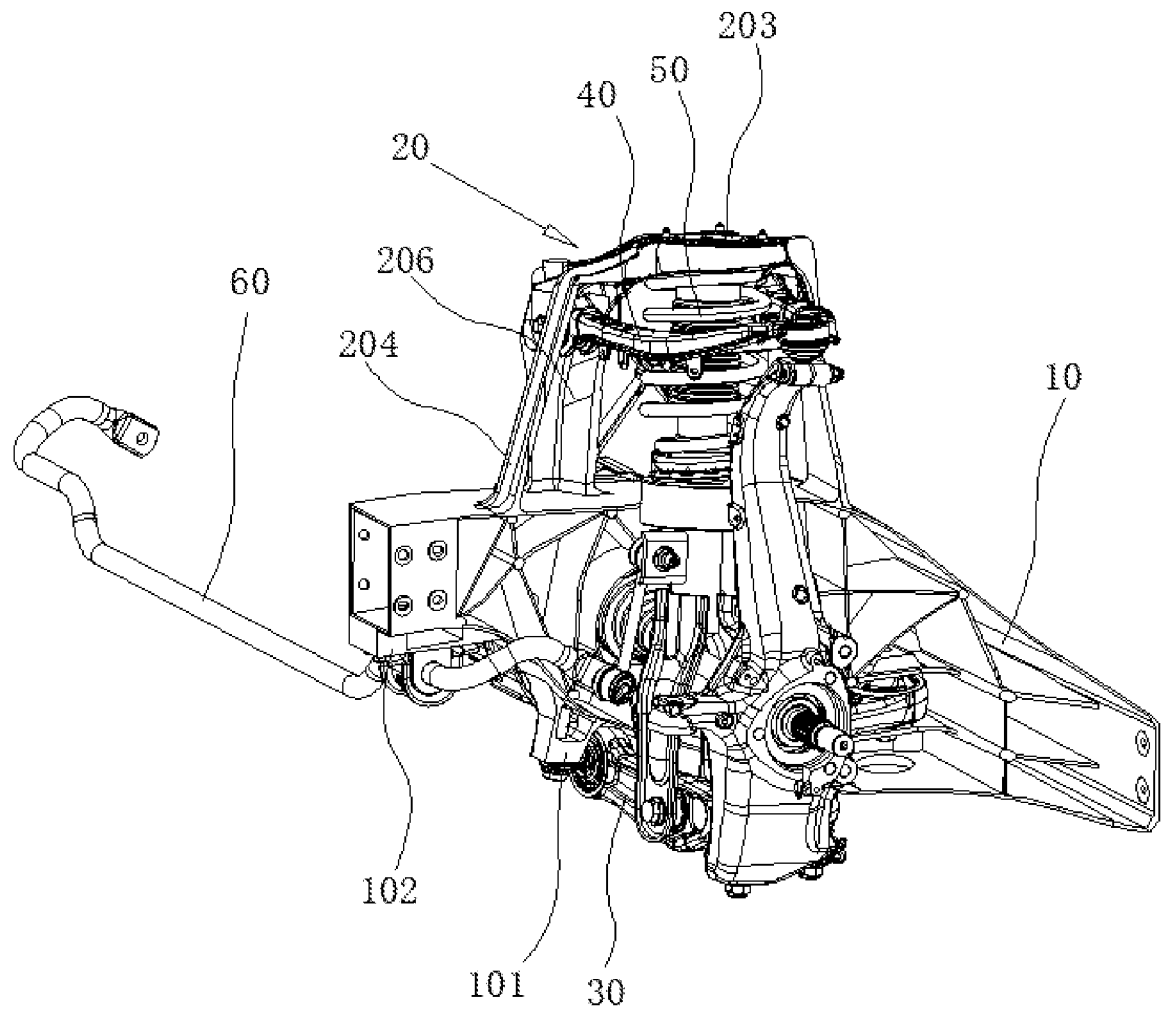
FIG. 5 is a schematic structural diagram with a transverse stabilizer bar mounted on the longitudinal beam assembly according to an embodiment of this application.

As shown in FIG. 5, in some embodiments, the longitudinal beam 10 is also provided with a stabilizer bar mount seat 102 configured to mount a transverse stabilizer bar 60.

The transverse stabilizer bar can be mounted directly through a stabilizer bar mount seat 102 provided on the longitudinal beam 10 during mounting without using additional components to connect to the transverse stabilizer bar 60 and the longitudinal beam assembly separately, simplifying the steps for mounting the transverse stabilizer bar 60. In addition, the stabilizer bar mount seat 102 being provided on the longitudinal beam 10 is conducive to quick mounting of the transverse stabilizer bar and the longitudinal beam 10 because the longitudinal beam 10 is integrally formed and the position precision of the stabilizer bar mount seat 102 is also higher.

Figure 6:
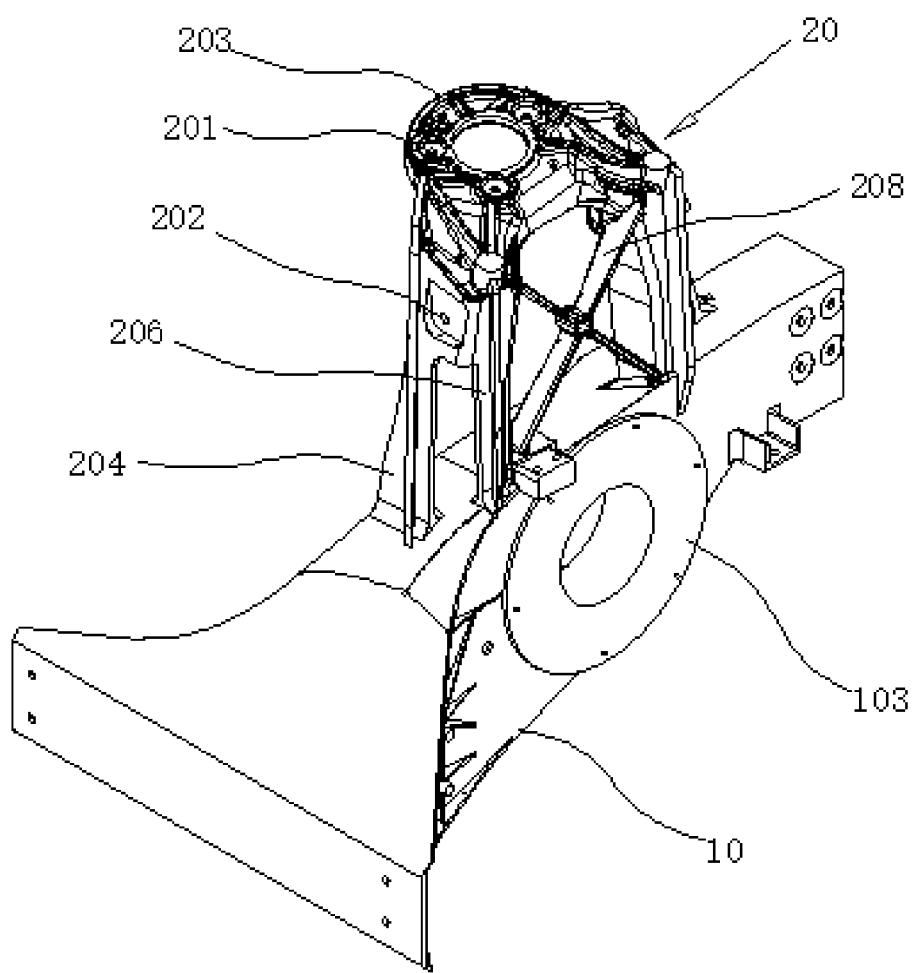
FIG. 6 is a schematic structural diagram of a longitudinal beam assembly according to yet another embodiment of this application.

As shown in FIG. 6, in some embodiments, the longitudinal beam 10 is also provided with a motor mount seat 103 configured to mount a drive motor.

The motor mount seat 103 has a surface that mates with at least one face of the motor, and the surface is provided with a hole for connecting the motor. The hole is used for a bolt to pass through to attach the drive motor to the motor mount seat 103.

With the foregoing solution, the drive motor is mounted on the longitudinal beam 10 through the motor mount seat 103, and the longitudinal beam 10 is closer to the driving wheels of the automobile so that power transmission of the drive motor is more efficient. In addition, because a distance between the drive motor and the wheels of the automobile is shorter, mechanical transmission members between the drive motor and the wheels are reduced, allowing for a simplified drive system structure of the automobile and a lighter mass of the automobile.

Figure 7:
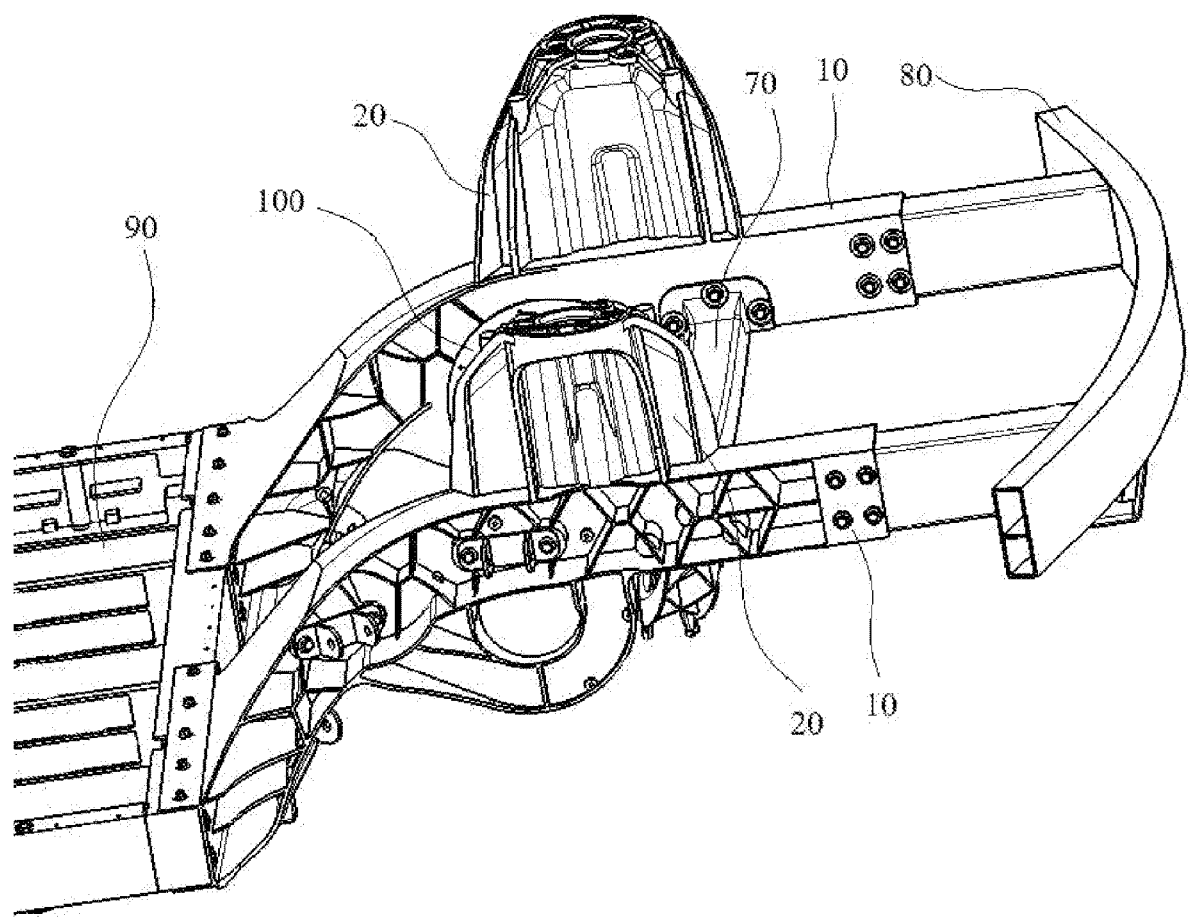
FIG. 7 is a schematic structural diagram of an automobile chassis according to an embodiment of this application.

As shown in FIG. 7, according to another aspect of the embodiment of this application, an automobile chassis is provided. The automobile chassis includes a drive apparatus 100 and a battery compartment, where the drive apparatus 100 is configured to provide a drive force for the automobile; the battery compartment includes a battery compartment frame 90, the battery compartment frame 90 being configured to accommodate a battery and the battery being used to provide power to the drive apparatus 100; and the longitudinal beam assembly is detachably connected to the battery compartment frame 90.

The drive apparatus 100 may be a motor, a drive motor, and the like. The drive apparatus 100 may be connected to the longitudinal beam. For example, the drive apparatus 100 is attached to the motor mount seat 103 on the longitudinal beam 10.

The battery compartment frame 90 may be a square frame or other polygonal frame, and may include a plurality of transverse structural members and longitudinal structural members which form a space for accommodating the battery. The frame structure can reduce the weight of the battery compartment and facilitate heat dissipation of the battery. The battery can be in the form of a plurality of battery cells or a plurality of battery modules. A plurality of intermediate transverse members and/or intermediate longitudinal members can also be provided inside the battery compartment frame 90 to form a plurality of separate compartments. The battery is mounted in and secured to the battery compartment frame 90, and the battery, by providing power to the drive apparatus 100, causes the drive apparatus 100 to provide a drive force for the automobile. The drive force can be used to satisfy a working electricity need during start, navigation, running, and the like of the automobile.

With the foregoing solution, both the drive apparatus 100 and the battery compartment are located on the automobile chassis. The battery installed in the battery compartment 90 can supply power to the drive apparatus 100 in close proximity and provide power to the drive apparatus 100 efficiently.

The battery compartment frame 90 is directly connected to the longitudinal beam assembly, which eliminates structures of the original chassis for the cab such as a crossbeam and a longitudinal beam, significantly reduces the number of parts of the automobile, improves the space utilization of the chassis, facilitates the battery compartment to carry more batteries, and further improves the endurance performance of the automobile.

In some embodiments, the battery is mounted on the transverse structural member of the battery compartment frame 90 and is detachably connected to the transverse structural member by a structure such as a bolt.

As shown in FIG. 7, in some embodiments, the drive apparatus 100 is mounted on the longitudinal beam assembly.

With the foregoing solution, the battery is located in the battery compartment 90. The battery compartment 90 is mounted on the longitudinal beam assembly, and the drive apparatus 100 is also mounted on the longitudinal beam assembly, so that the battery can maintain a relatively fixed position relationship with the drive apparatus 100, so as to stably provide power to the drive apparatus 100.

In some embodiments, the drive apparatus is a motor, and the motor is mounted directly on the motor mount seat 103 of the longitudinal beam 10 of the longitudinal beam assembly.

As shown in FIG. 7, in some embodiments, the automobile chassis includes two longitudinal beam assemblies, and the longitudinal beams 10 of the two longitudinal beam assemblies are provided at the bottom of the automobile body parallel to each other along a length of the automobile body. The two longitudinal beams 10 are connected to each other by a crossbeam 70, and there may be one or more crossbeams 70. The crossbeam 70 may also be made of steel or aluminum alloy with excellent stiffness and strength properties, and the crossbeam 70 and the longitudinal beams 10 may be fixed in a welding or bolted joint manner.

The crossbeam 70 connects the two longitudinal beam assemblies into a whole. When the automobile is turning or the load is uneven on two sides of the automobile, or when the automobile is subjected to an impact force on one side from the wheels, stresses on the two longitudinal beam assemblies are different, and the crossbeam 70 can balance the stresses on the two longitudinal beam assemblies in this process, so that the two longitudinal beam assemblies are subjected to the stress synchronously, thereby ensuring the torsional stiffness of the automobile chassis. In addition, the crossbeam 70 can also be used to bear certain longitudinal loads, as well as to support the main components of the automobile.

As shown in FIG. 7, in some embodiments, the automobile also includes an anti-collision beam 80. The anti-collision beam 80 is connected to the longitudinal beams 10 of the two longitudinal beam assemblies in a welding or bolted joint manner. When the automobile has a frontal collision, the anti-collision beam 80 first bears the collision force and absorbs part of the collision energy, and the remaining collision energy is transmitted to the longitudinal beam and the automobile body. Thus, the anti-collision beam 80 has the functions of absorbing the collision energy, reducing damage of the collision force to the automobile longitudinal beams, protecting the main structure of the automobile body, and improving the safety performance of the automobile.

As shown in FIG. 7, in some embodiments, the battery compartment frame 90 may be attached to an end of the longitudinal beam 10, the battery compartment frame 90 may alternatively be attached between the two longitudinal beams 10 of the two longitudinal beam assemblies, or the battery compartment frame 90 may alternatively be fixed to the crossbeam 70. FIG. 7 is a schematic diagram only illustrating the battery compartment frame 90 attached to the ends of the two longitudinal beams 10, from which persons skilled in the art may speculate or reasonably imagine other ways of connecting the battery compartment frame 90 to the longitudinal beam assembly. Details are not described herein in this embodiment of this application.

In conclusion, in the embodiments of this application, the first suspension mounting portion 101, the second suspension mounting portion 202, and the shock absorber mounting portion 201 are all integrated on the longitudinal beam 10 and are integrally formed with the longitudinal beam 10 directly or indirectly so that a longitudinal beam assembly structure becomes simpler and more compact. As compared with the related art in which each mounting portion is combined with the longitudinal beam 10 by welding, the longitudinal beam assembly in the embodiments of this application has a simpler manufacturing process, a shorter manufacturing time, and a lower manufacturing cost. In addition, in the integrally formed longitudinal beam assembly manufactured, the first suspension mounting portion 101, the second suspension mounting portion 202, and the shock absorber mounting portion 201 are not subject to welding errors, and their positions are more precise, which reduces the difficulty of subsequent mounting of the suspension lower swing arm 30, the suspension upper swing arm 40, and the shock absorber 50 and improves the mounting efficiency.

Persons skilled in the art can understand that, although some of the embodiments described herein include some features included in other embodiments, combinations of features of different embodiments are meant to be within the scope of this application and form different embodiments. For example, in the claims, any one of the claimed embodiments may be used in any combination.

In conclusion, the foregoing embodiments are merely intended for describing the technical solutions of this application, but not for limiting this application. Although this application is described in detail with reference to the foregoing embodiments, persons of ordinary skills in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A longitudinal beam assembly, comprising:
    an integrally formed longitudinal beam, provided with a first suspension mounting portion, wherein the first suspension mounting portion is configured to mount a suspension lower swing arm; and
    a mounting tower mounted on the longitudinal beam, wherein the mounting tower is provided with a shock absorber mounting portion and a second suspension mounting portion, the shock absorber mounting portion being configured to mount a shock absorber and the second suspension mounting portion being configured to mount a suspension upper swing arm, the mounting tower comprises a top wall and two first support members, the shock absorber mounting portion is disposed on the top wall, the two first support members are disposed respectively on two sides of the top wall and connect the top wall and the longitudinal beam, two suspension mount seats protrude downwards from the top wall, and the second suspension mounting portion comprises a mounting hole passing through one of the two suspension mount seats and one of the two first support members.

2. The longitudinal beam assembly according to claim 1, wherein the two first support members are gradually moved away from each other in a direction from the top wall to the longitudinal beam so as to form a triangular structure between the two first support members and the longitudinal beam.

3. The longitudinal beam assembly according to claim 1, wherein the second suspension mounting portion comprises two suspension upper swing arm mounting sites, one of the suspension upper swing arm mounting sites being located at the mounting hole of the second suspension mounting portion.

4. The longitudinal beam assembly according to claim 3, wherein the mounting tower further comprises two second support members, the two second support members being disposed between the top wall and the longitudinal beam, and the two second support members being mounted between the two first support members.

5. The longitudinal beam assembly according to claim 4, wherein one of the two suspension mount seats is connected to one of the two second support members.

6. The longitudinal beam assembly according to claim 4, wherein the one of the two first support members is provided with a reinforcing portion, and the mounting hole passes through the reinforcing portion.

7. The longitudinal beam assembly according to claim 4, wherein the mounting tower further comprises a reinforcing structure having an X shape, and the reinforcing structure has four attachment ends, two of the attachment ends being attached to the top wall and the other two of the attachment ends being attached to the longitudinal beam.

8. The longitudinal beam assembly according to claim 7, wherein the two attachment ends attached to the top wall are attached at intersections between the top wall and the two second support members, and the two attachment ends attached to the longitudinal beam are attached at intersections between the longitudinal beam and the two second support members.

9. The longitudinal beam assembly according to claim 4, wherein the two first support members and/or the two second support members are integrally formed with the top wall.

10. The longitudinal beam assembly according to claim 1, wherein the longitudinal beam is further provided with a stabilizer bar mount seat for mounting a transverse stabilizer bar.

11. The longitudinal beam assembly according to claim 1, wherein the longitudinal beam is further provided with a motor mount seat for mounting a drive motor.

12. An automobile chassis, comprising:
    the longitudinal beam assembly according to claim 1;
    a drive apparatus configured to provide a drive force for the automobile; and
    a battery compartment comprising a battery compartment frame, wherein the battery compartment frame is configured to accommodate a battery, the battery being used to provide power to the drive apparatus;
    wherein the longitudinal beam assembly is detachably connected to the battery compartment frame.

13. The automobile chassis according to claim 12, wherein:
    the drive apparatus is mounted on the longitudinal beam assembly.

* * * * *